United States Patent
Kim et al.

(10) Patent No.: US 11,642,945 B2
(45) Date of Patent: May 9, 2023

(54) DOOR CURTAIN HOOK DEVICE FOR VEHICLE

(71) Applicants: Hyundai Motor Company, Seoul (KR); Kia Motors Corporation, Seoul (KR)

(72) Inventors: Do-Won Kim, Seoul (KR); Dong-Keun Yoo, Anyang-si (KR); Jae-Seung Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 201 days.

(21) Appl. No.: 16/675,491

(22) Filed: Nov. 6, 2019

(65) Prior Publication Data
US 2020/0238796 A1   Jul. 30, 2020

(30) Foreign Application Priority Data
Jan. 24, 2019   (KR) .................. 10-2019-0009317

(51) Int. Cl.
*B60J 1/20* (2006.01)
*F16B 19/10* (2006.01)

(52) U.S. Cl.
CPC ........... *B60J 1/2047* (2013.01); *B60J 1/2063* (2013.01); *F16B 19/1081* (2013.01)

(58) Field of Classification Search
CPC ........ B60J 1/2047; B60J 1/2063; B60J 3/023; B60J 1/2086; B60J 1/08; B60J 1/04; B60J 1/2083; B60J 1/2044; F16B 19/1081; F16B 45/00
See application file for complete search history.

(56) References Cited

U.S. PATENT DOCUMENTS

| | | | | |
|---|---|---|---|---|
| 5,560,575 A | * | 10/1996 | Krysiak | B60R 7/10 248/222.12 |
| 5,560,669 A | * | 10/1996 | Gute | B60J 3/023 248/222.12 |
| 6,196,756 B1 | * | 3/2001 | Leverger | B60J 3/023 403/326 |
| 6,347,775 B1 | * | 2/2002 | Edlinger | B60J 1/2047 160/370.22 |
| 6,491,333 B2 | * | 12/2002 | Ichikawa | B60J 3/023 296/97.13 |
| 8,579,010 B2 | * | 11/2013 | Medlar | B60J 1/2047 160/368.1 |
| 8,978,309 B2 | * | 3/2015 | Goto | E06B 9/42 49/502 |
| 9,789,752 B1 | * | 10/2017 | Sia, Jr. | B60J 1/2086 |
| 10,036,410 B2 | * | 7/2018 | Lesecq | F16B 19/1081 |

(Continued)

FOREIGN PATENT DOCUMENTS

KR   2002-0096235 A   12/2002

*Primary Examiner* — Abe Massad
(74) *Attorney, Agent, or Firm* — Morgan, Lewis & Bockius LLP

(57) ABSTRACT

A door curtain hook device for a vehicle may include a frame mount configured to be fixed to a door frame of the vehicle; a curtain hook having a wedge portion configured to be coupled with the frame mount and a curtain locking portion in which a door curtain is hooked integrally formed thereon; and a door curtain mounting gap formed to have a hook structure in the curtain locking portion.

9 Claims, 8 Drawing Sheets

(56) References Cited

U.S. PATENT DOCUMENTS

| | | | |
|---|---|---|---|
| 2007/0099452 A1* | 5/2007 | Okada | F16B 21/088 |
| | | | 439/101 |
| 2010/0162534 A1* | 7/2010 | Kato | F16B 45/00 |
| | | | 24/292 |
| 2019/0381867 A1* | 12/2019 | Kim | B60J 1/2069 |
| 2021/0086592 A1* | 3/2021 | Tsao | B60J 3/0221 |

* cited by examiner

DETAIL A

DOOR CURTAIN HOOK DEVICE FOR VEHICLE

CROSS-REFERENCE TO RELATED APPLICATION

The present application claims priority to Korean Patent Application No. 10-2019-0009317, filed on Jan. 24, 2019, the entire contents of which is incorporated herein for all purposes by this reference.

BACKGROUND OF THE DISCLOSURE

Field of the Disclosure

The present invention relates to a door curtain hook device for a vehicle, and more particularly, to a door curtain hook device for a vehicle, which can easily mount a door curtain.

Description of Related Art

Generally, a door curtain for a vehicle is used to cover the internal of the vehicle while shielding light which is received through a transparent door glass.

For example, there may be a door curtain mounted at the rear door of a large passenger vehicle and for protecting the privacy of the passenger while shielding the light. In the instant case, the door curtain is divided into an automatic type driven by a motor through a button operation and a manual type lifted by the passenger's hand and fixed to a hook mounted at the upper frame of the door.

In recent years, the door curtain has become the necessity not only for high-grade large-sized vehicles but also for multi-purpose vehicles for leisure to improve the marketability of the vehicle.

However, since the manual type door curtain is a method for hooking by use of a door curtain hook device, it has the disadvantage in that its application is not easy.

For example, in the case of the vertical arrangement structure of a wedge portion and a curtain locking portion that operate to be mounted at the frame in the manual type door curtain, a space for inserting the wedge is required, such that the formation of the upper space causes the presence of the non-shielding region through the upper end portion thereof, inevitably deteriorating the marketability.

On the other hand, in the case of an external insertion curtain locking portion structure in the manual type door curtain, it is possible to solve the problem of the presence of the non-shielding region through the upper end portion thereof, but the door curtain cannot be inevitably mounted because a gap, which is required to be formed with the glass run, is not enough.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a door curtain hook device configured for a vehicle, which can solve the difficulty of mounting the door curtain by the vertical arrangement structure of a curtain locking portion or an external insertion curtain locking portion structure, and, can maximize the amount of the shielded light configured for covering with the upper end portion of a door curtain in a state where the door curtain has been mounted thereon.

According to various aspects of the present invention, a door curtain hook device configured for a vehicle may include a frame mount configured to be fixed to a door frame of the vehicle and a curtain hook coupled with the frame mount, and the curtain hook can have a wedge portion configured to be coupled with the frame mount and a curtain locking portion in which a door curtain is hooked integrally formed thereon, securing a door curtain mount gap.

The frame mount may include a frame mount main body; an elastic fixing portion formed on an upper surface of the frame mount main body and for fixing the wedge portion of the curtain hook and an extension fixing portion formed on a lower surface of the frame mount main body and for fixing the curtain locking portion of the curtain hook.

The present invention may be a structure in which a through-hole through which the wedge portion of the curtain hook passes is punched in the frame mount main body.

A concave groove, which is coupled with the curtain hook and for preventing the movement thereof, may be formed at the side portion of the frame mount main body.

The elastic fixing portion can have protrusions formed to face each other to fix the wedge portion of the curtain hook.

The protrusions may be formed to be spaced in a state which is mutually inclined inwardly.

The extension fixing portion can have a fixing locking protrusion formed thereon to be fixed to the rear surface of the side surface of the curtain locking portion.

The end point of the fixing locking protrusion may be a shape which is shifted upwardly.

The curtain hook may include a curtain hook main body; a wedge portion formed to be protruded upwardly from the curtain hook main body; and a curtain locking portion formed to be protruded downwardly from the curtain hook main body.

A protrusion which is coupled with the frame mount and for preventing the movement thereof, may be formed at the side portion of the curtain hook main body.

The wedge portion may include a body portion; a concave portion formed to be recessed at the body portion; and a head portion positioned at the upper end portion of the body portion.

A stepped portion configured to be fixed to the fixing locking protrusion of the frame mount may be formed at the rear surface of the side surface of the curtain locking portion.

The concave portion may be a structure which is engaged with the protrusion formed at the elastic fixing portion of the frame mount.

According to an exemplary embodiment of the present invention, the door curtain hook device configured for the vehicle can maximize the light shielding portion at the upper end portion of the door curtain while securing the curtain mounting space, improving the marketability and the convenience.

Furthermore, according to an exemplary embodiment of the present invention, the door curtain hook device configured for the vehicle can solve the restriction of the vertical arrangement structure of the curtain locking portion or the structural restriction of the external insertion curtain locking portion that makes it difficult to mount the door curtain, being easily used even in the high-grade large-sized vehicles and the multi-purpose vehicles for leisure.

The methods and apparatuses of the present invention have other features and advantages which will be apparent

Figure 1:
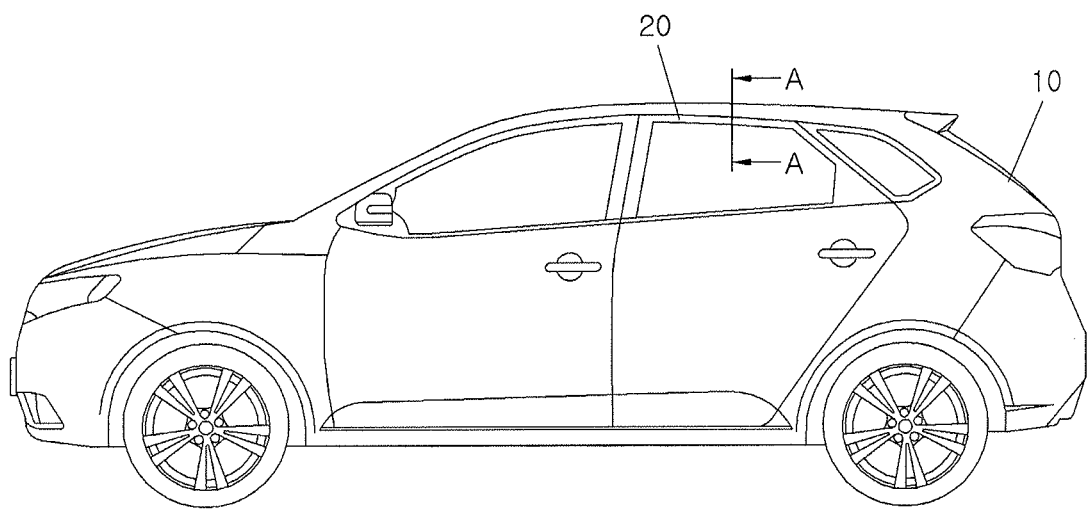
FIG. 1 is a schematic diagram of a vehicle on which a door curtain hook device configured for the vehicle is mounted according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The exemplary embodiments described below are provided so that those skilled in the art can easily understand the technical spirit of the present invention, and the present invention is not limited thereto. Furthermore, those illustrated in the accompanying drawings are the drawings illustrated for easily explaining the exemplary embodiments of the present invention and may be different from forms actually implemented.

It may be understood that when any component is referred to as being connected or coupled to another element, it may be directly connected or coupled to another element, but other components can also be present therebetween.

Figure 2:
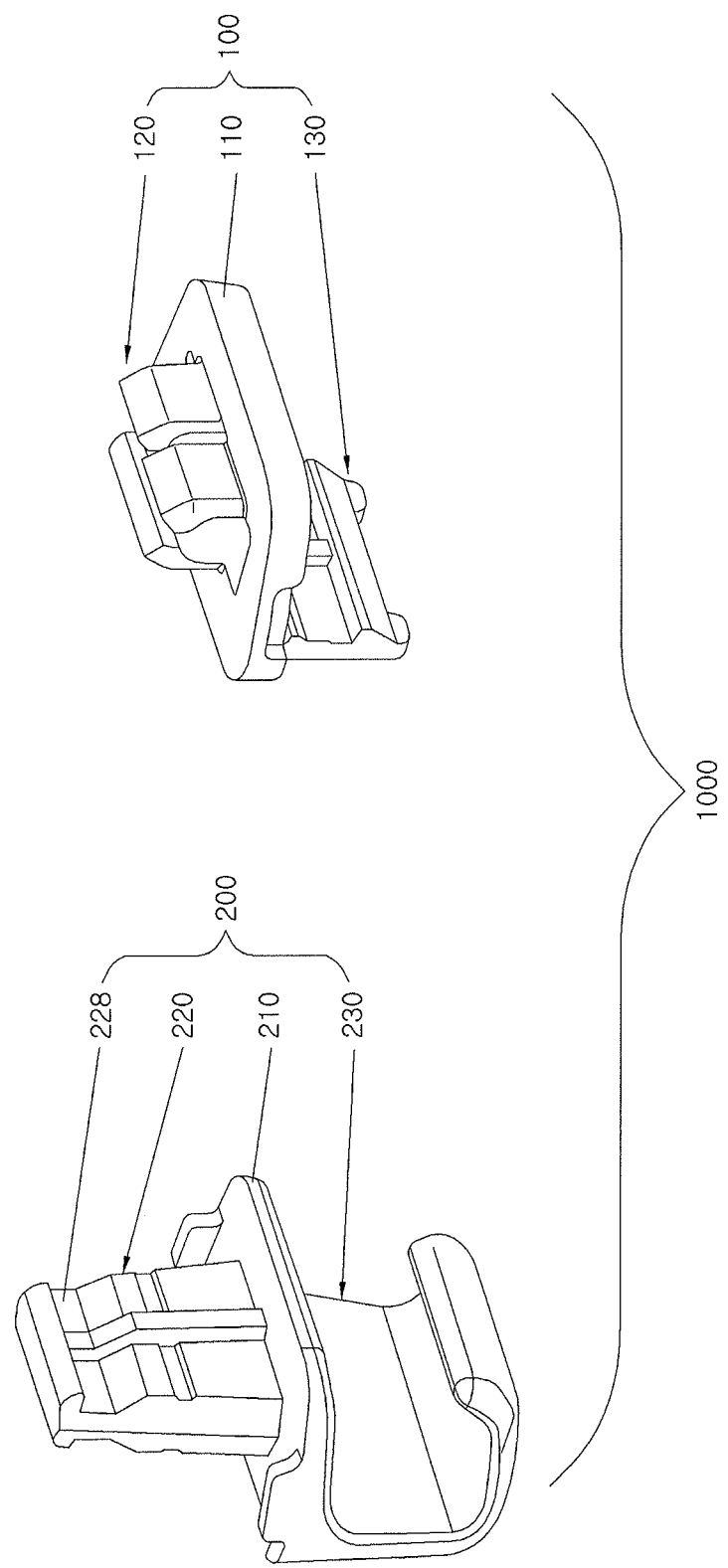
FIG. 2 is an exploded perspective diagram of the door curtain hook device configured for the vehicle according to an exemplary embodiment of the present invention.
Figure 3:
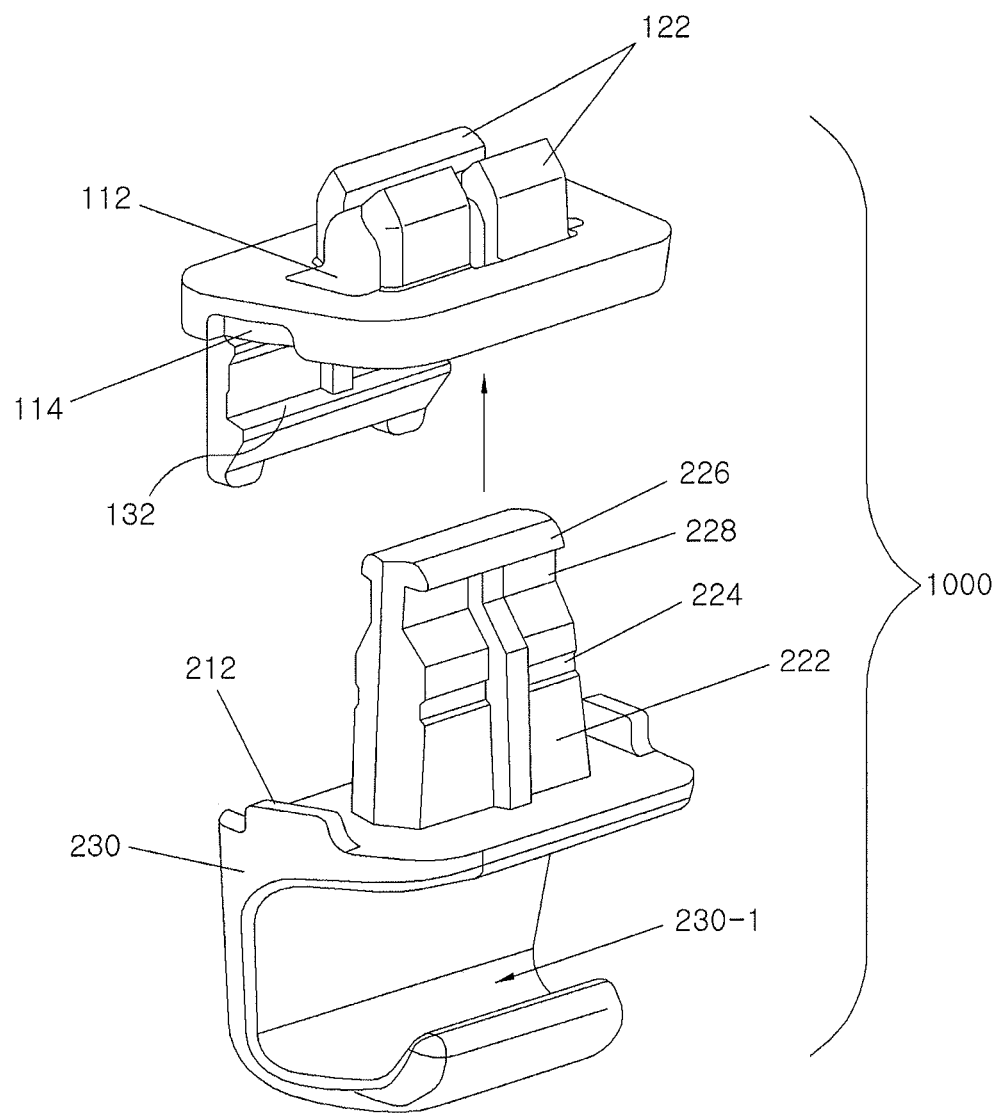
FIG. 3 is another exploded perspective diagram of the door curtain hook device configured for the vehicle according to an exemplary embodiment of the present invention of FIG. 2.
Figure 4:
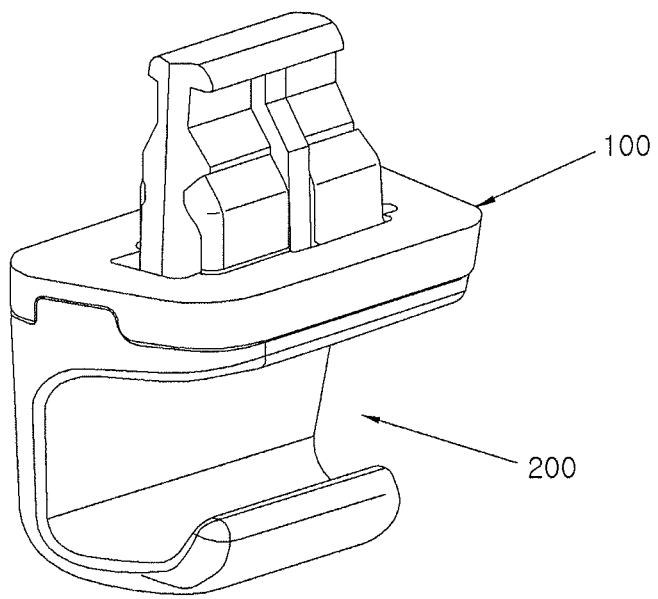
FIG. 4 is a perspective diagram of the door curtain hook device configured for the vehicle according to an exemplary embodiment of the present invention.

FIG. 1 is a schematic diagram of a vehicle on which a door curtain hook device configured for the vehicle is mounted according to an exemplary embodiment of the present invention, FIG. 2 is an exploded perspective diagram of the door curtain hook device configured for the vehicle according to an exemplary embodiment of the present invention, FIG. 3 is another exploded perspective diagram of the door curtain hook device configured for the vehicle according to an exemplary embodiment of the present invention of FIG. 2, and FIG. 4 is a perspective diagram of the door curtain hook device configured for the vehicle according to an exemplary embodiment of the present invention.

Referring to FIG. 1, FIG. 2, FIG. 3, and FIG. 4 together, a door curtain hook device configured for a vehicle 1000 according to an exemplary embodiment of the present invention includes a frame mount 100 fixed to a door frame 20 of a vehicle 10 and a curtain hook 200 coupled to the frame mount 100. The curtain hook 200 has a wedge portion 220 coupled with the frame mount 100 and a curtain locking portion 230 formed below the wedge portion 220 integrally formed thereon. The curtain locking portion 230 forms a door curtain mounting gap 230-1 of a hook structure, and the door curtain mounting gap 230-1 secures the insertion space of the upper end portion of the door curtain so that a door curtain 30 (FIG. 6) is hooked to one opening portion by a hook structure.

In an exemplary embodiment of the present invention, the frame mount 100 is configured to include a frame mount main body 110, an elastic fixing portion 120, and an extension fixing portion 130.

The elastic fixing portion 120 is formed on an upper surface of the frame mount main body 110 and for fixing the wedge portion 220 of the curtain hook 200. The extension fixing portion 130 is formed below one side of the frame mount main body 110 and for fixing the curtain locking portion 230 of the curtain hook 200.

According to an exemplary embodiment of the present invention, a through-hole 112 through which the wedge portion 220 of the curtain hook 200 passes is punched in the frame mount main body 110. The through-hole 112 preferably corresponds to a shape of the wedge portion 220.

Herein, a concave groove 114, which is coupled with the curtain hook 200 and for preventing the movement of the forward and backward directions or the lateral direction thereof, is formed at the side portion of the frame mount main body 110.

In an exemplary embodiment of the present invention, the elastic fixing portion 120 has protrusions 122 formed to face each other to fix the wedge portion 220 of the curtain hook 200. The protrusions 122 are preferably formed to be spaced from each other in a state which is mutually inclined inwardly with respect to the vertical direction thereof. As described above, the protrusions 122 are formed to be spaced in the inclined state to have the elasticity, such that the protrusion 122 and the wedge portion 220 are in close contact with each other.

According to an exemplary embodiment of the present invention, the curtain hook 200 is configured to include a curtain hook main body 210, the wedge portion 220 formed to be protruded upwardly from the curtain hook main body 210, and the curtain locking portion 230 formed to be protruded downwardly from the curtain hook main body 210.

Herein, the protrusion 212, which is coupled with the frame mount 100 and for preventing the movement thereof, is formed at the side portion of the curtain hook main body 210. That is, the protrusion 212 is coupled with and fixed to a concave groove 114 formed at the side portion of the frame mount main body 110.

Meanwhile, the wedge portion 220 is configured to include a body portion 222, a concave portion 224 formed to be recessed in the body portion 222, and a head portion 226 positioned at the upper end portion of the body portion 222. The concave portion 224 is engaged with the protrusion 122 formed at the elastic fixing portion 120 of the frame mount 100.

Furthermore, one side surface of the curtain locking portion 230, that is, the rear surface of the portion extending downwardly from the curtain hook main body 210 is formed with a stepped portion 232 (FIG. 5) fixed to a fixing locking protrusion 130 of the frame mount 100. As such, the extension fixing portion 130 is formed with the fixing locking protrusion 132 to be fixed to the rear surface of the side surface of the curtain locking portion 230. Furthermore, the side surface of the curtain locking portion 230 is preferably a shape which is inclined toward the glass side of the vehicle with respect to the vertical direction thereof.

Figure 6:
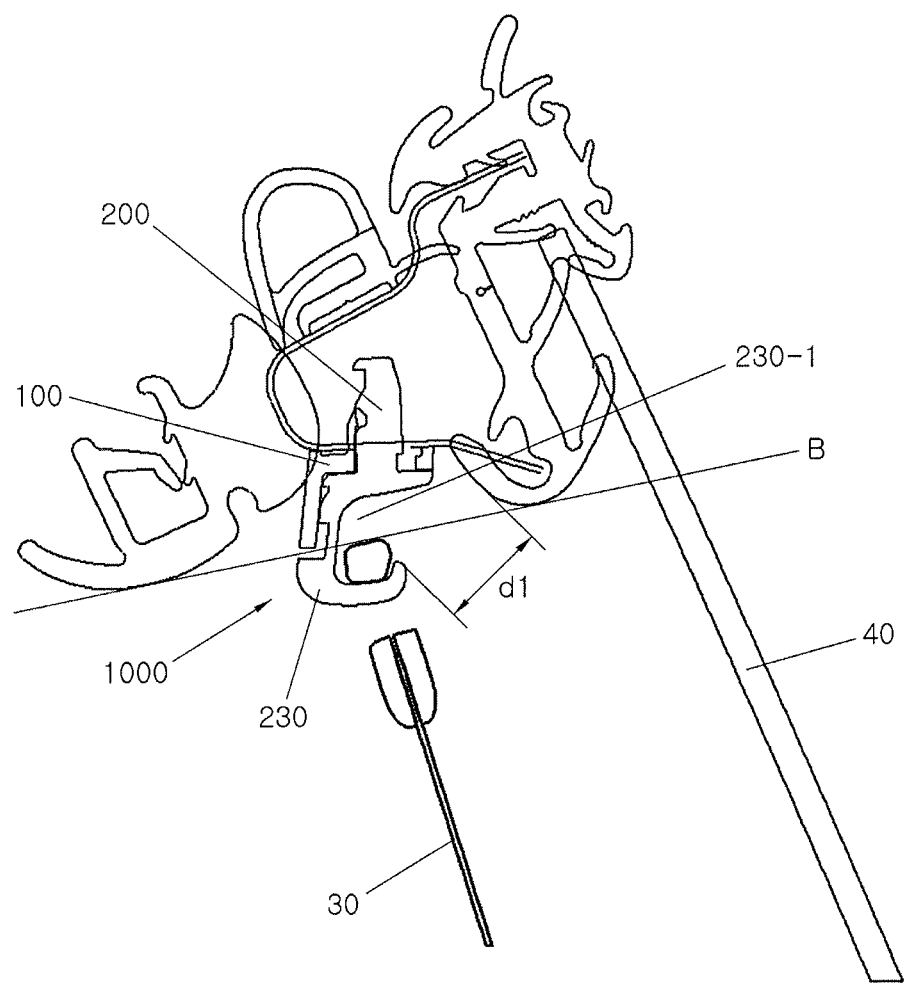
FIG. 6 is a schematic cross-sectional diagram of the door curtain hook device configured for the vehicle according to an exemplary embodiment of the present invention taken along the line A-A of FIG. 1.

Meanwhile, the end portion of the curtain locking portion 230 is a structure which is formed with the door curtain mounting gap 230-1 which is formed to have an annular shape and can hook the curtain 30 (FIG. 6).

Figure 5A:
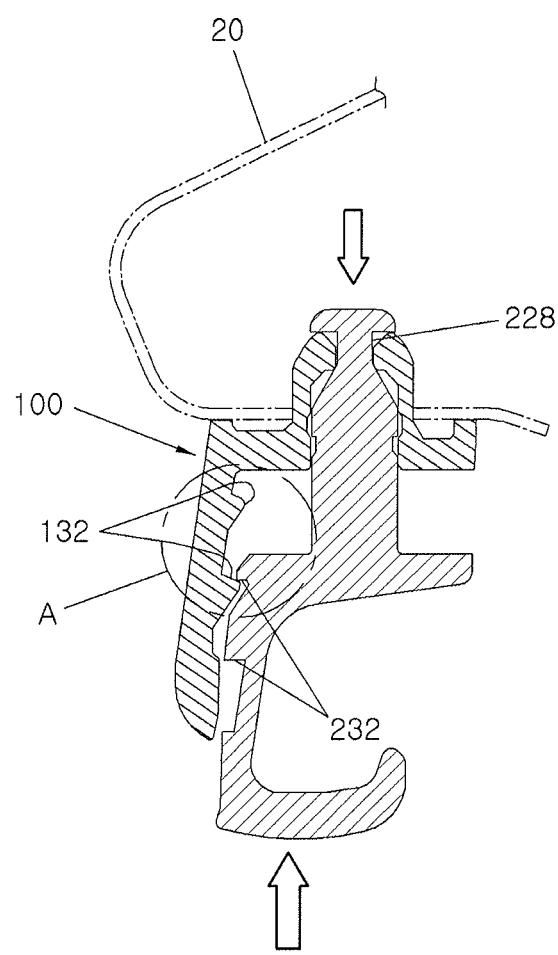
FIG. 5A, FIG. 5B and FIG. 5C are schematic cross-sectional diagrams of the door curtain hook device configured for the vehicle according to an exemplary embodiment of the present invention taken along the line A-A of FIG. 1.
Figure 5B:
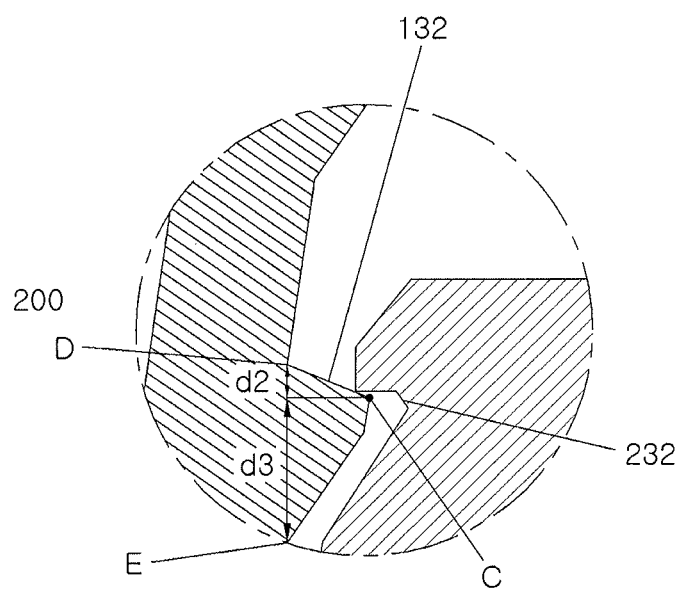
Figure 5C:
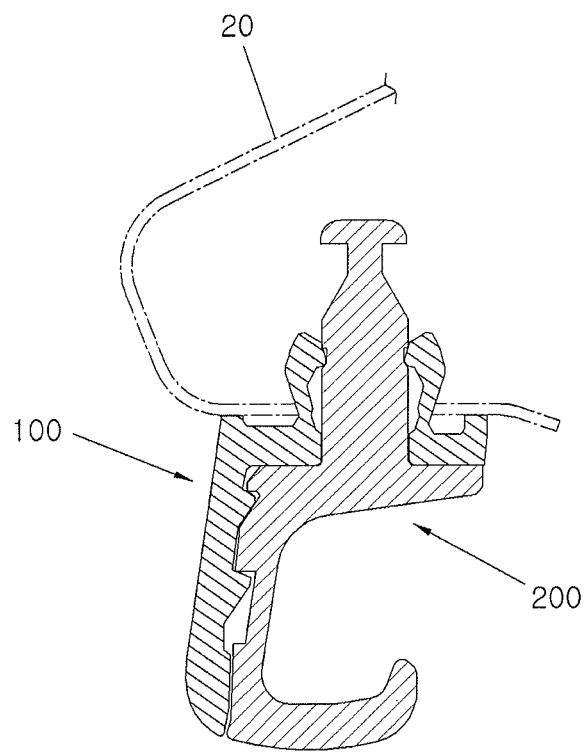

FIG. 5A, FIG. 5B and FIG. 5C are schematic cross-sectional diagrams of the door curtain hook device configured for the vehicle according to an exemplary embodiment of the present invention taken along the line A-A of FIG. 1.

Describing the coupled relationship of the door curtain hook device configured for the vehicle according to an exemplary embodiment of the present invention with reference to FIG. 5 together with FIGS. 1 to 4, the door curtain hook device configured for the vehicle 1000 is configured to include the frame mount 100 fixed to the door frame 20 of the vehicle 10 and the curtain hook 200 coupled to the frame mount 100. The door curtain hook device configured for the vehicle 1000 mounts the frame mount 100 to an upper door frame 20.

As such, the wedge portion 220 of the curtain hook 200 is inserted upwardly from the lower side thereof into the through-hole 112 punched in the frame mount 100.

The frame mount main body 110 of the frame mount 100 and the curtain hook main body 210 of the curtain hook 200 are coupled to contact with each other.

In an exemplary embodiment of the present invention, additional concave groove 228 is formed on the head portion 226 of the wedge portion.

Accordingly, the frame mount main body 110 of the frame mount 100 is temporarily coupled to the additional concave groove 228 of the curtain hook main body 210 of the curtain hook 200.

At the instant time, as the curtain hook 200 further moves upwards, the concave groove 114 formed at the frame mount main body 110 of the frame mount 100 and the protrusion 212 formed at the curtain hook main body 210 of the curtain hook 200 are coupled with each other, preventing the movement thereof (see FIG. 3 and FIG. 4).

Furthermore, the elastic fixing portion 120 of the frame mount 100 and the concave portion 224 of the wedge portion 220 of the curtain hook 200 are coupled to each other and fixed.

At the same time, the fixing locking protrusion 132 formed at the extension fixing portion 130 of the frame mount 100 and the stepped portion 232 formed at the curtain locking portion 230 of the curtain hook 200 are coupled to each other so that the frame mount 100 and the curtain hook 200 are coupled to each other.

Furthermore, the end point of the fixing locking protrusion 132 is a shape which is shifted upwardly. In the instant case, since the load is applied downwardly, one of the fixing locking protrusions 132 will be referred to as an example.

For example, the distance d2 from the center portion of the end point C of the fixing locking protrusion 132 to the upper protrusion starting point D of the fixing locking protrusion 132 is configured smaller than the distance d3 from the end point C of the fixing locking protrusion 132 to the lower protrusion starting point E of the fixing locking protrusion 132. A shape of the fixing locking protrusion 132 may be a triangular or polygonal shape.

As such, the upper end portion of the door curtain 30 is inserted and hooked into the door curtain mounting gap 230-1 to be fixed at the end portion of the curtain locking portion 230 of the curtain hook 200.

FIG. 6 is a schematic cross-sectional diagram of the door curtain hook device configured for the vehicle according to an exemplary embodiment of the present invention taken along the line A-A of FIG. 1.

Referring to FIG. 6, as in the drawing, it may be seen that the external light incident through a window glass 40 and the door curtain 30 is shielded based on the line B, and furthermore, the space d1, which can hook the door curtain 30 to the door curtain hook device configured for the vehicle 1000, may be secured by the door curtain mounting gap 230-1.

Therefore, the door curtain hook device configured for the vehicle according to an exemplary embodiment of the present invention can maximize the light shielding portion at the upper end portion of the door curtain while securing the curtain mounting space, improving the marketability and the convenience.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A door curtain hook device for a vehicle, the door curtain hook device comprising:
   a frame mount configured to be fixed to a door frame of the vehicle; and
   a curtain hook detachably coupled to the frame mount, wherein the frame mount includes:
a frame mount main body;
an elastic fixing portion integrally formed on an upper surface of the frame mount main body and configured for fixing a wedge portion of the curtain hook; and
an extension fixing portion extending downwardly from a lower surface of the frame mount main body and configured for fixing a curtain locking portion of the curtain hook,
wherein the curtain hook includes:
the wedge portion configured to be coupled with the elastic fixing portion of the frame mount; and
the curtain locking portion integrally formed on the wedge portion and including a door curtain mounting gap formed to have a hook structure and in which a door curtain is configured to be hooked, and
wherein the extension fixing portion of the frame mount has a fixing locking protrusion formed thereon to be coupled to a rear surface of a side surface of the curtain locking portion,
wherein the elastic fixing portion includes first protrusions separately formed to be spaced from each other in a state which is mutually inclined inwardly in an acute angle with respect to a vertical direction thereof, the first protrusions having elasticity, such that the first protrusions are locked to the wedge portion while the first protrusions and the wedge portion are in contact with each other, and
wherein a side surface of the curtain locking portion extends downwardly and is inclined toward a window glass side of the vehicle with respect to a vertical direction thereof to provide a space to hook the door curtain, such that an amount of shielded light configured for covering with an upper end portion of the door curtain is increased,
wherein the wedge portion includes:
a body portion;
a first concave portion formed to be recessed at a middle of the body portion;
a head portion formed at an upper end portion of the body portion; and
a second concave portion formed at the upper end portion of the body portion, below the head portion,
wherein the curtain hook is configured to be temporarily coupled to the frame mount in a first position in which the first protrusions are received in the second concave portion to enable insertion of the head portion and the elastic fixing portion into an opening in the door frame, and the curtain hook is configured to be fully coupled to the frame mount in a second position in which the first protrusions are received in the first concave portion and the head extends past the first protrusions to expand the elastic fixing portion to be wider than the opening in the door frame and prevent removal of the head portion and the elastic fixing portion from the opening.

2. The door curtain hook device of claim 1,
wherein the frame mount main body includes a through-hole through which the wedge portion of the curtain hook is configured to pass.

3. The door curtain hook device of claim 2,
wherein the elastic fixing portion includes the first protrusions formed along a periphery of the through-hole to face each other to fix the wedge portion of the curtain hook.

4. The door curtain hook device of claim 1,
wherein a concave groove configured to be coupled with the curtain hook is formed at a side portion of the frame mount main body.

5. The door curtain hook device of claim 1,
wherein the first protrusions of the elastic fixing portion are formed to face each other to fix the wedge portion of the curtain hook.

6. The door curtain hook device of claim 1, wherein the curtain hook further includes:
a curtain hook main body,
wherein the wedge portion is formed to be protruded in a first direction from the curtain hook main body, and
wherein the curtain locking portion is formed to be protruded in a second direction from the curtain hook main body.

7. The door curtain hook device of claim 6,
wherein second protrusions which are configured to be coupled with a concave groove each formed at a side portion of the frame mount main body, are formed at opposite side portions of the curtain hook main body.

8. The door curtain hook device of claim 1,
wherein the first concave portion is configured to be engaged with the first protrusions formed at the elastic fixing portion of the frame mount.

9. The door curtain hook device of claim 1,
wherein the curtain locking portion includes a stepped portion formed at a rear surface of a side surface of the curtain locking portion and configured to be fixed to the fixing locking protrusion.

* * * * *